United States Patent [19]

Toepperwien

[11] Patent Number: 5,007,329
[45] Date of Patent: Apr. 16, 1991

[54] WORKING PISTON, IN PARTICULAR FOR A BRAKE BOOSTER

[75] Inventor: Bernd Toepperwien, Rossdorf, Fed. Rep. of Germany

[73] Assignee: Alfred Teves GmbH, Frankfurt am Main, Fed. Rep. of Germany

[21] Appl. No.: 336,171

[22] Filed: Apr. 11, 1989

[30] Foreign Application Priority Data

Apr. 20, 1988 [DE] Fed. Rep. of Germany ....... 3813144

[51] Int. Cl.$^5$ ............................................. F01B 19/00
[52] U.S. Cl. ....................................... 92/98 D; 92/99
[58] Field of Search ..................... 92/96, 97, 98 D, 99, 92/48, 49, 169.1, 170.1, 98 R

[56] References Cited

U.S. PATENT DOCUMENTS

| | | | |
|---|---|---|---|
| 4,531,370 | 7/1985 | Hendrickson et al. | 92/169.1 |
| 4,534,270 | 8/1985 | Nishii | 92/98 D |
| 4,632,014 | 12/1986 | Endo | 92/48 |
| 4,747,336 | 5/1988 | Uyama | 92/98 D |
| 4,803,912 | 2/1989 | Nishii | 92/99 |
| 4,846,047 | 7/1989 | Uyama et al. | 92/169.1 |
| 4,892,027 | 1/1990 | Wagner et al. | 91/369.2 |

FOREIGN PATENT DOCUMENTS

| | | |
|---|---|---|
| 0238376 | 9/1987 | European Pat. Off. . |
| 2540606 | 3/1977 | Fed. Rep. of Germany . |
| 1363241 | 8/1974 | United Kingdom ............... 92/98 R |
| 2082275 | 3/1982 | United Kingdom . |
| 2102089 | 1/1983 | United Kingdom . |
| 2144816 | 8/1984 | United Kingdom . |
| 2181805 | 4/1987 | United Kingdom . |

*Primary Examiner*—Edward K. Look
*Assistant Examiner*—Christopher M. Verdier
*Attorney, Agent, or Firm*—Robert P. Seitter; J. Gordon Lewis

[57] ABSTRACT

Working pistons, in particular those of brake boosters, have to tolerate a considerable number of changes in stress and great forces acting on the piston. Simultaneously, it is an object to construct the pistons as lightweight as possible. Due to the considerable forces in the axial direction, it is imperative for the piston to be well secured on the guiding axis. On the other hand, the central guide's projection securing the piston in the axial direction can cause local stresses on the piston and, thus, fatigue in the material which implies a premature failure of the piston. It is an object of this invention to improve the central circumference of the piston no longer is rigidly clamped into the central guide, but rather in that the inner end and the support are designed so as to enable a swivelling motion of the piston plate without local bending stress, thereby the life of the piston being considerably prolonged.

10 Claims, 2 Drawing Sheets

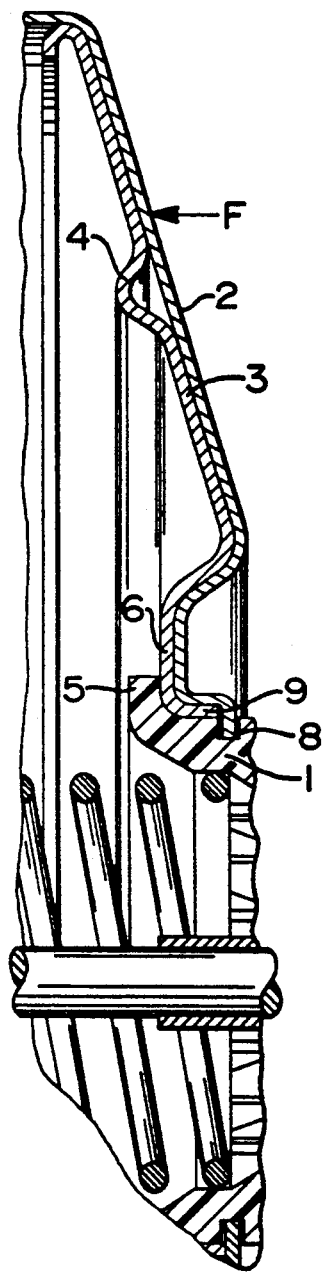
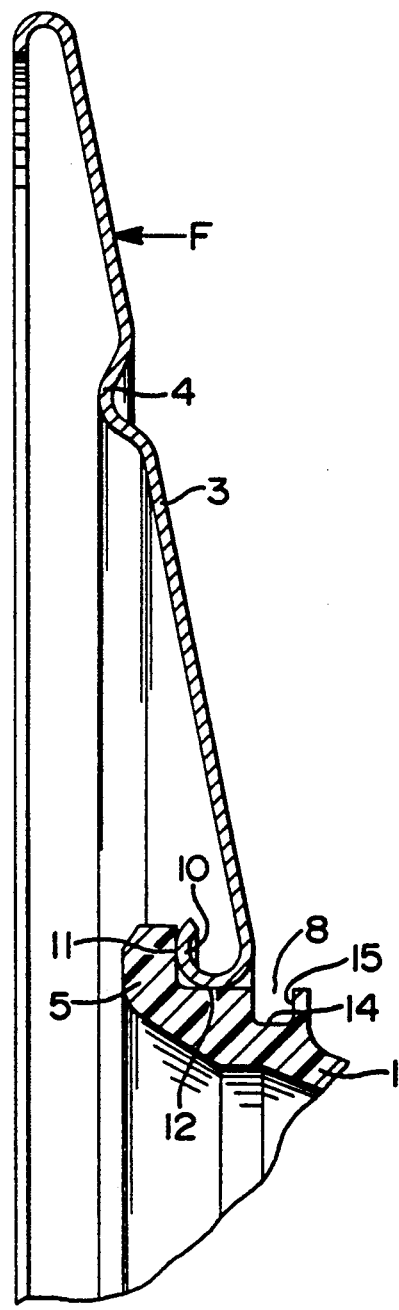

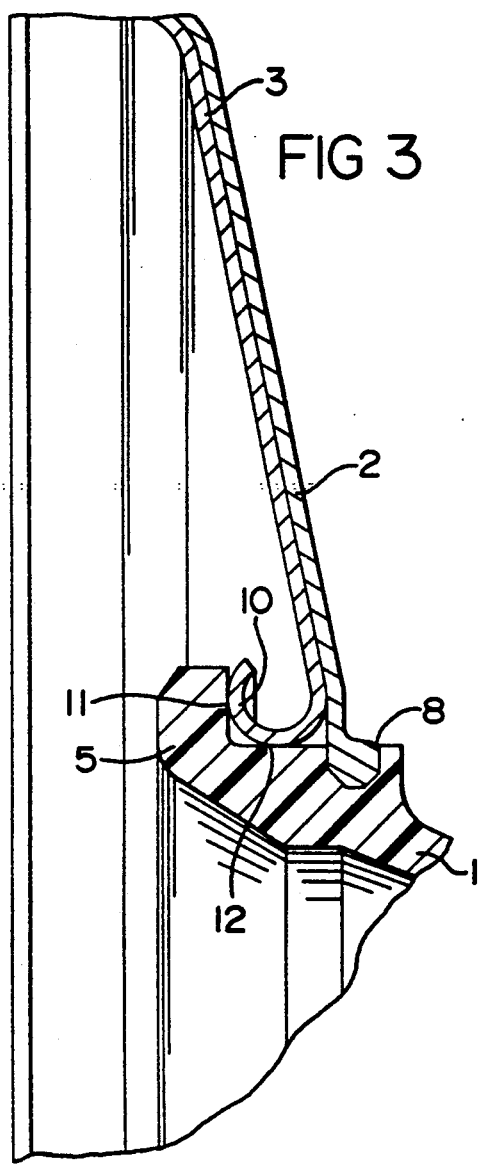
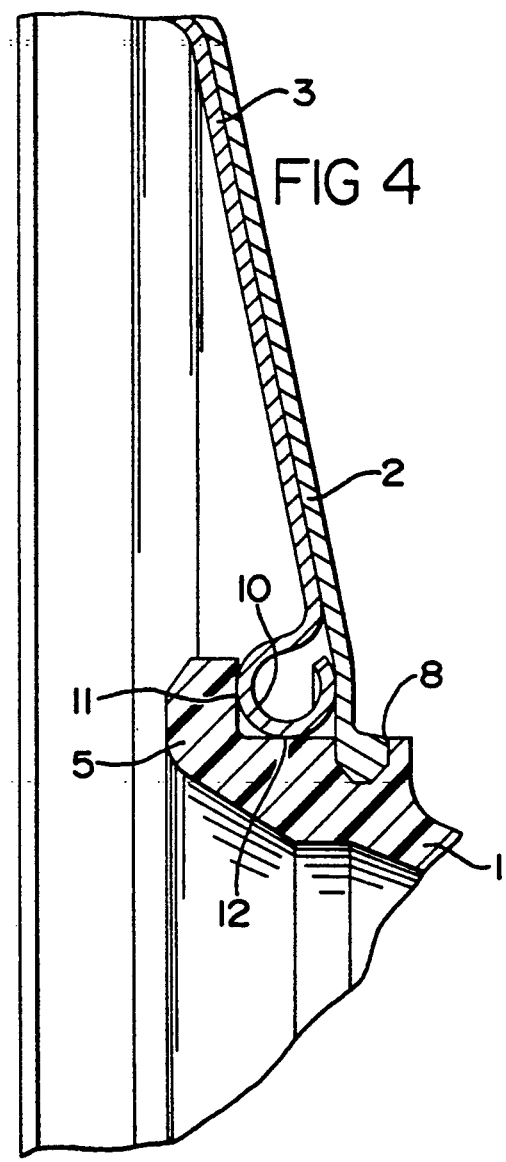

WORKING PISTON, IN PARTICULAR FOR A BRAKE BOOSTER

BACKGROUND OF THE INVENTION

Brake boosters, often also referred to as brake apparatuses, serve to assist the foot pressure during application of a brake, with the pressure difference between the engine's intake pipe and the atmospheric outside pressure being used as an energy source. Such brake boosters are described in detail on pages 88–108 of the 9th edition of the Alfred Teves "Bremsenhandbuch" (Brake Handbook) published by Bartsch Verlag, Ottobrunn near Munich. As can be clearly seen from the cited literature on pages 96, 97, for instance, brake boosters inter alia have an essentially plate-shaped working piston centrally held in a so-called control housing and guided by the same in the axial direction. The plate-shaped working piston serves to support a rolling diaphragm subdividing the cylinder into two working chambers which are acted upon by different pressures and which thus imply an axial movement of the working piston.

In regards to the aforementioned working pistons, a problem exists in supporting an essentially plate-shaped piston centrally in a plastic guide housing, and requiring the plate-shaped piston to be manufactured as thin as possible for weight reasons. On the other hand, it has to be considered that weight forces of up to half a ton can act on the plate-shaped piston and that the working piston must tolerate frequent application of movement in both directions and, hence, due to opposing actions of forces, cannot show symptoms of fatigue which might lead to the destruction of the booster.

Referring to the support of the plate-shaped piston in the guide housing in German patent application No. P 37 40 691, FIGS. 1–3, it is suggested that the inner end of the plate-shaped piston is bent in an essentially rectangular manner towards the rolling diaphragm so as to render an annular inner edge via which the plate-shaped piston radially supports itself on the controlling guide housing. In the axial direction, the inside of the plate-shaped piston is held by a surrounding projection on which the inner end is supported in the direction away from the diaphragm. On the opposite side, axial movement of the plate-shaped piston is prevented by the inner end of the rolling diaphragm which is held in a corresponding groove in the housing.

The present invention is thus based on a working piston and its object is to improve the central support of such working piston in a simple and cost-saving manner. In particular, the inventive working piston is to be manufactureable so as to be weight-saving.

SUMMARY OF THE INVENTION

The present invention, in principle, consists of a construction wherein the inner end of the plate-shaped piston is no longer connected unmovably with the holding housing, but rather the plate-shaped piston is allowed a certain rotary motion at its inner end. This rotary motion is not hindered by a stop edge of the housing, which edge might cause local symptoms of fatigue and thus a destruction of the plate-shaped piston. In a preferred embodiment of the present invention, the plate-shaped piston includes an arching portion which rests on a corresponding supporting surface on the guide housing.

A particular simple design will result for the inner end of the plate-shaped piston due to the arching portion being formed in the approximate shape of a circle closed for three quarters of its circumference, which allows for swivelling motion.

In order to prevent the open end of the arching portion from working against the adjacent diaphragm, a further development of this invention in one embodiment consists of the arching portion being bent away from the adjacent diaphragm which covers the piston surface. If due to the size of the arching portion's circumference and the height of the projection at the housing, the axial movement of the plate-shaped piston is hindered, the inventive device ensures that, despite the swivelling motion, the plate-shaped piston will not be able to abut on the upper projection edge of the housing, in that a further development of this invention includes a radial projection of the guide housing upon which the arching portion of the piston rests in the axial direction, and an annular supporting surface of the guide housing upon which the arching portion rests in the radial direction.

A particularly light-weight working piston will be achieved by making the piston out of aluminium. The resistance against buckling of the piston can be increased by including an annularly surrounding bead on the piston on the side away from the diaphragm.

An essential simplification is assembling the rolling diaphragm can be achieved by locating a chamfer on the inner end of the diaphragm facing the plate shaped piston. The invention simultaneously permits a reinforcement of the housing in a critical area by using a groove shape in the guide housing adapted to the chamfered shape of the inner diaphragm edge, and also having a pentagonal shape.

BRIEF DESCRIPTION OF THE DRAWING

In the following figures, an example of an embodiment of this invention will be explained with reference to the drawing, wherein:

FIG. 1 is an embodiment of the prior art with reference to which the object to be solved will be explained; and FIG. 2 is an example of an embodiment of this invention;

FIG. 3 is a view similar to FIG. 2 further illustrating a surrounding chamfer in the rolling diaphragm and the pentagonal cross section of the groove of the guide in accordance with an alternate embodiment; and, FIG. 4 is a view similar to FIG. 3 which illustrates an alternate embodiment in which the annular arching portion of the piston plate bends toward the diaphragm.

DETAILED DESCRIPTION OF THE INVENTION

FIG. 1, a portion of a brake booster is shown in a sectional representation, having a housing 1 which holds the surrouding inner end of a rolling diaphragm 2 in a surrounding groove 8. The rolling diaphragm supports itself in the direction of the force arrow F on a plate-shaped piston 3 having a bent-off inner edge 9 supporting itself in the radial direction on an annular supporting surface of the housing 1. Axial movement of the plate-shaped piston 3, in the direction of the force arrow F, is prevented by a surrounding projection 5 of the housing 1 so that the housing is carried along in the direction of the arrow by the action of the force F distributed over the surface of the plate-shaped piston 3.

Studies, however, have revealed that the force F, due to its lever movement, causes symptoms of fatigue in the plate-shaped piston 3 in the area of the upper edge of the projection 5, which may result in an annular fracture zone 6.

It is an object of this invention to avoid such a fracture zone.

According to this invention, this object is effected by an embodiment of the piston in correspondence with FIG. 2.

In FIG. 2, similar reference numerals as those in FIG. 1 are used for components corresponding to one another. However, as compared to FIG. 1, the rolling diaphragm 2 is not shown in FIG. 2. As is evident from FIG. 2, the plate-shaped piston 3 no longer supports itself on the housing 1 by means of an inner edge, but rather by means of an essentially circular arching portion 10 abutting a narrow annular supporting surface 12 on the housing 1 in the radial direction. In the axial direction, arching portion 10 of piston 3 abuts a narrow annular supporting surface 11 on the projection 5 of the housing. Referring to the housing 1, in this design, surfaces 11 and 12 extending in the radial and axial directions, as shown in FIG. 2, are provided. The supporting contour of the housing 1, however, may also be adapted in relation to the arched contour of the arching portion 10 of the plate-shaped piston 3 so that a more advantageous force distribution will be achieved without preventing the desired swivelling capacity of the plate-shaped piston in the direction of the arrow F around the supporting surface. As is easily discernible, in FIG. 2, a local stress on the plate-shaped piston 3 in the area of zone 6 (FIG. 1) will be prevented in case of such a swivelling motion as, in the radial direction, the piston now no longer rests rigidly on the projection 5.

The arching portion 10 can also be effected in the opposite direction so that the open end of the arching portion points towards the diaphragm. In this case, it only has to be ensured that the open end of the arching does not work against the diaphragm and that, simultaneously, upon swivelling motion, due to the force F, the upper edge of the projection 5 cannot act locally on the plate-shaped piston 3 and thus cause an annular stress.

Irrespective of the position of the opening of the arching portion 10, the same need not have the shape of a partial circle, but rather may be rounded suitably in another way, e.g., in the shape of an ellipse. Further, the circle of the arching portion 10 may also be closed or may be open by more than one quarter as long as it is ensured that, in case of a swivelling motion, the open end of the arching portion 10 will lie parallel to the supporting surface of the projection 5 when the open end of the arching portion 10 faces the projection. The arching portion may be open to a wider extent even if the open end of the arching portion points in the direction of the diaphragm.

A considerable simplification with regard to assembly of the rolling diaphragm 2 as per FIG. 1 will result due to the fact that the end inserted into the groove 8 is chamfered on the lower edge; the angle may be approximately 45 degrees. If this chamfer is placed towards the plate-shaped-piston-side end of the diaphragm, it will also be possible to provide a corresponding surrounding projection 14 within the groove 8 of the housing 1, the contour of said projection 14 corresponding to the chamfer of the rolling diaphragm 2. As is evident from FIG. 2, the surrounding projection 14, 15 is connected with the housing so as to form a single piece and is instrumental in reinforcing the housing in an area which is critical due to tensile and bending stresses. The surrounding bead 4 contributes to strengthening against buckling the plate-shaped piston 3, which preferably can be manufactured from a light-weight metal such as aluminium, yet also may be made from sheet steel of a correspondingly lesser thickness.

What is claimed is:

1. A working piston for a brake booster, comprising a substantially plate-shaped piston (3) is centrally held by a guide housing (1) and is axially guided in a working cylinder, and wherein a rolling diaphragm (2) which, on its outer circumference, is sealingly fixed on the inside wall of the working cylinder and which substantially covers the piston surface, is held immediately adjacent the central mounting of the plate-shaped piston (3) in a groove (8) in the guide housing (1) wherein the centrally held plate-shaped piston (3) has a surrounding arching portion (10) by means of which the plate-shaped piston rests on a corresponding supporting surface (11, 12) on the guide housing (1).

2. A working piston as claimed in claim 1, wherein the sectionally represented arching portion (10) is substantially in shape of a circle closed for substantially three quarters of its circumference.

3. A working piston as claimed in claim 1 wherein the annular arching portion extends at an angle from the adjacent rolling diaphragm (2).

4. A working piston as claimed in claim 1, wherein the annular arching portion extends towards the rolling diaphragm.

5. A working piston as claimed in claim 1, wherein the plate-shaped piston is made of aluminium.

6. A working piston as claimed in claim 1, wherein the plate-shaped piston (3) has an annularly surrounding bead (4) on the side facing away from the diaphragm.

7. A working piston as claimed in claim 1, wherein in the axial direction, the surrounding arching portion (10) rests on a radial projection (5) on the guide housing (1) and in the radial direction, the arching portion rests on an annular supporting surface (12) of the guide housing (1).

8. A working amendment as claimed in claim 1, wherein a surrounding groove (8) is provided in the guide housing (1) adjacent the supporting surface (12) of the plate-shaped piston, the annular end of the rolling diaphragm being held in said groove (8).

9. A working piston as claimed in claim 8, wherein the inner end of the rolling diaphragm (2) has a surrounding chamfer facing the plate-shaped piston (3), said chamfer having an inclination of approximately 45 degrees.

10. A working piston as claimed in claim 9, wherein the shape of the groove (8) conforms to the chamfered shape of the inner diaphragm edge and wherein the cross-section of the groove has a pentagonal shape.

* * * * *